Sept. 9, 1958 R. SENIOR 2,851,670
CABLE CONNECTOR
Filed June 2, 1955

INVENTOR.
Robert Senior.
BY Wood, Herron & Evans.
ATTORNEYS.

United States Patent Office 2,851,670
Patented Sept. 9, 1958

2,851,670

CABLE CONNECTOR

Robert Senior, Cincinnati, Ohio, assignor to Empire Products, Inc., Cincinnati, Ohio, a corporation of Ohio Application June 2, 1955, Serial No. 512,609

4 Claims. (Cl. 339—75)

This invention relates to couplings for connecting sections of heavy cables of the type which is used for electric arc welding. The invention also relates to a method of making such couplings.

Obviously, the cables which supply the current for the welding operations on a large structure, such as a ship, must be repeatedly lengthened or shortened as the work progresses in order to provide the necessary cable length and to prevent fouling of cables of unnecessary length. The cables are therefore made in sections which are provided with a coupling element at each end and necessarily the coupling elements must interlock interchangeably. The couplings which have been used in the past have usually been constituted by a split plug member and a socket member, the plug disposed on one end of each cable section, the socket on the other. For efficient operation every plug and every socket of the system must be reliably connectable.

Under conditions such as prevail in a shipyard the coupling elements are subjected over a period of time to very hard usage. The coupling elements are usually fabricated of brass, not only because of its good electrical conductivity and ready machineability, but also because it has been found that brass surfaces in frictional engagement provide a good electrical connection. However, brass is a relatively soft metal which tends to deform even under conditions of normal usage. Also, the plug elements of the connectors are exposed when a section of coupling is not in use and, hence, are subject to damage such as being stepped on or having tools or other objects fall on them, or the cable sections may be handled or thrown around in careless fashion or the plugs may be dropped on steel or concrete surfaces. Hence, the plugs heretofore used have not had the desired durability and ruggedness.

It is an object of the present invention to provide an improved plug element for a cable coupling which stands up in normal use, and to abuse, better than the plugs which have been used heretofore.

It is also necessary that the coupling on the cable sections interconnect securely so that they do not disengage when the cable is pulled or moved and so that they do not loosen if subjected to vibration. Therefore, another object of the invention is to provide a cable coupling which combines a more rugged connecting plug with a mating socket structure to effect an improved physical and electrical coupling. An additional object of the invention is to provide a method of making cable couplings in quantity production and within the tolerances requisite to insure both a good connection and complete interchangeability of coupler elements.

The purpose of using a split plug as employed in the prior art is to provide resiliency so that the plug may be slightly oversize in relation to the socket and so that the cam engaging boss in the socket engages a resilient element which yields slightly as the frictional connection is effected by relative rotation of the elements. It is this type of interlock which has been found to be particularly satisfactory in practice.

The width of the slit or gap between the two arms of a prior art split plug has been greater than the plug's tolerance to elastic deformation. In other words, if a heavy object drops on the plug, the arms are sprung together permanently. Also, such permanent deformation can result from overtightening the couplings, i. e., camming the arms together too far. Once a plug member has been permanently deformed it does not form a tight, dependable coupling with a female member; but rather tends to become disengaged when subjected to even a small amount of jarring or vibration.

The present invention obviates this difficulty by providing one or more contact lugs carried by one or more of the plug arms which extends or extend inwardly into the bifurcating slot of the plug to limit inward deformation of the plug and keep it within the tolerance of the resiliency of the plug arms.

Preferably and as illustrated, two lugs are formed on the face of the plug. These lugs extend inwardly toward each other in the bifurcating slot and are formed in any suitable manner, preferably by upsetting the metal adjacent to the face of the plug. This upsetting may easily be performed by applying a blunt cylindrical punch to the face of the plug to depress a central area of the plug face a fraction of an inch, thereby forcing the metal subjected to the pressure inwardly across the slot. The displaced metal forms two engaging contacts or lugs. During this metal upsetting operation the wall of the plug is confined by a die which preferably has the exact diameter of the socket. The result of these operations is a resilient plug which is more resistant to deformation than the plugs now in use and which does not deform to a diameter which is undersized in relation to the socket.

Other objects and further advantages will be described in relation to the accompanying drawings in which.

Figure 1:
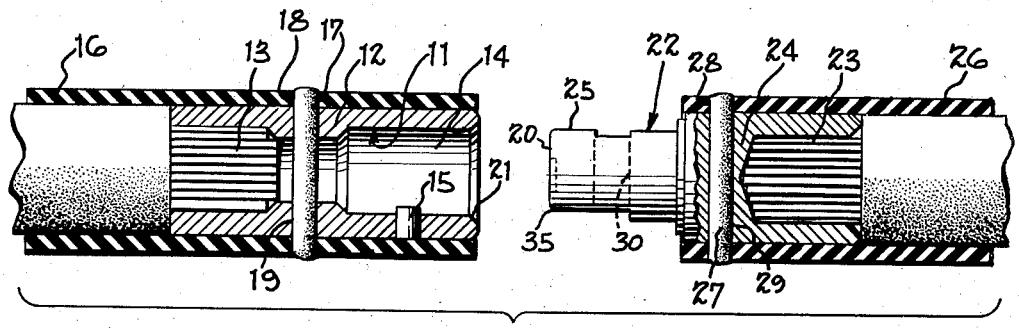
Figure 1 is a longitudinal cross-sectional view of coupling members constructed in accordance with the present invention.

As shown in Figure 1, a cylindrical or tubular female element 11 is subdivided by an internal ring or collar 12 into two sockets, a soldering socket 13 in which the end of the cable may be fastened by conventional soldering technique and a plug socket 14 into which the plug of the coupling is connected. This plug socket 14 is provided with a boss 15 which projects radially inwardly from the inner cylindrical wall of the socket.

The collar 12 may be held in the tubular member 11 by press fitting or any conventional technique, and the boss 15 may be riveted to the wall of socket 14. The tubular female member 11 is entirely covered by an insulating sheath 16 which is secured in position by a plastic pin 17 which passes through aligned apertures in the sheath 16, tubular member 11, and collar 12. The apertures in the sheath 16 are designated 18, and those in the tubular member 11 are designated 19. The mouth of the plug socket 14 is tapered inwardly as at 21 to facilitate insertion of the plug.

The plug member 22 comprises a soldering socket 23 on the end to which the cable is connected, a solid central portion 24, and a projecting plug proper 25. The soldering socket is covered by an insulating sheath 26 which is secured in position by a plastic pin 27 which is driven through apertures 28 in the sheath and aperture 29 which passes through the solid central portion of the plug member.

Figure 2:
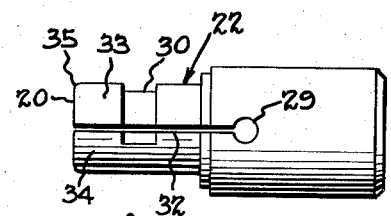
Figure 2 is a side elevational view of a partially fabricated male plug member following the external machining and sawing operations.
Figure 3:
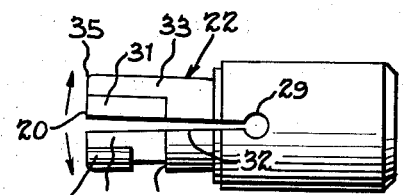
Figure 3 is an exaggerated view showing the spreading of the male plug arms subsequent to sawing.
Figure 4:
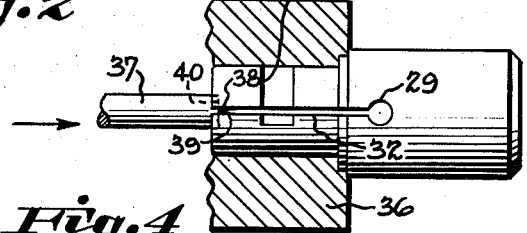
Figure 4 is a side elevational view, partly in section, showing the upsetting operation.

As diagrammatically illustrated in Figures 2–4, plug 22 is fabricated by first machining a transverse cam groove 30 which extends slightly more than 180° about the circumference and is disposed slightly above the middle of the plug proper. This cam groove has a slightly helical configuration so that when the plug and socket are rotated relatively the plug is drawn slightly farther into the socket. A boss track 31 is then machined in the cylindrical wall of plug 22 from the face of the plug down to the bottom of the cam groove, the latter being flush with the boss track in the area of intersection. If desired, a groove may be used as a boss track, but preferably and as disclosed, a flat area is machined on the side of plug 22. Preferably the boss track is so positioned in relation to the cam groove that substantially one-half of its flat surface extends to the bottom of the cam groove and substantially half of its flat surface extends to the top of the cam groove, as best shown in Figure 3.

Next, the plug is bifurcated by sawing longitudinally through a diameter from the face 20 to aperture 29 which is in the solid portion of the element between the plug proper and soldering socket. This operation provides slot 32 which divides the element into two arms 33 and 34. The slot 32 is positioned so that it cuts through the low edge of the cam groove 30 and bifurcates the cam track 31.

Next, the arms 33 and 34 of the plug are spread outwardly by a spreading tool to effect permanent deformation of the arms and to provide a plug diameter which is greater than the diameter of the socket with which the plug is to be used. The edge of the face 20 of the plug is rounded as at 35 in order to provide a surface which can be wedged into the tapered mouth of the socket.

As a final operation, the arms of the plug are confined in a die 36 which has the exact diameter as the socket with which the plug is to be used. This forces the arms of the plug inwardly toward each other but not sufficiently to close the slot between the arms. A punch 37 is then applied to the center of the plug face to upset the metal under the punch to provide inwardly extending lugs 38 and 39. This operation provides a slight depression 40 in the center of the face 20 of the plug. This upsetting operation forces the metal adjacent to the plug face inwardly into the slot so that the lugs are in physical engagement with each other while the plug remains in the die. The upsetting operation may be performed on one plug arm or the other, but it is more convenient to upset the metal of both arms slightly than to effect a more severe upsetting operation on one arm only. After the plug is removed from the die the arms flex outwardly so that there is a minute space between the stop lugs in the slot.

Figure 5:
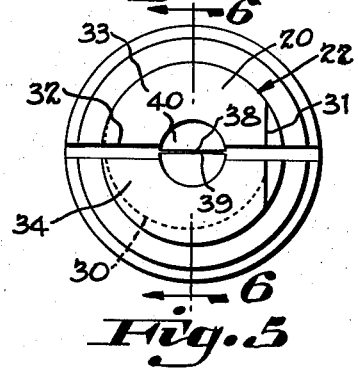
Figure 5 is an end view of a male coupling member.
Figure 6:
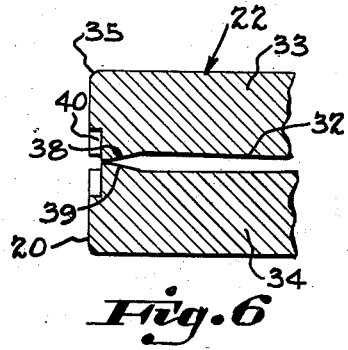
Figure 6 is a cross-sectional view taken along line 6—6 of Figure 5.

This method of fabricating the plug provides a very rugged and accurate plug. Even if the plug is stepped on, dropped, or abused by concussion, the arms of the plug cannot be flexed inwardly beyond their elastic limits, that is, the plug cannot be permanently deformed. Also, in use the plug cannot be permanently deformed by the inward pressure of the cam boss because the arms are prevented by the lugs from being forced toward each other to a degree which would exceed the elastic limits of the metal of the arms. No matter how hard the arms are forced together, they still spring back when released so that the lugs 38 and 39 are slightly spaced from one another as in Figures 5 and 6. In other words, under no circumstances can the plug be reduced to a lesser diameter than the diameter of the socket in which it fits. This construction and technique of manufacture combine to insure ruggedness, long life, and a physical and electrical connection of the required reliability.

Having described my invention, I claim:

1. A coupling for electric cables comprising a substantially cylindrical plug member and a cylindrical plug socket, each being adapted for connection to a cable, said plug socket having a boss projecting inwardly radially, said plug member having a longitudinal slot bifurcating it into two plug arms adapted to be inserted into the plug socket, a transverse cam groove intermediate the ends of the plug arms, said cam grooves adapted to engage with the boss in the socket, whereby a resilient frictional clamp between the plug and socket is established by relative rotation of the plug and socket serving to resiliently urge said arms together, a longitudinal boss track between the cam groove and the face of the plug to permit the boss of the socket to enter the cam groove and stop members projecting inwardly from the arms into the slot to limit inward flexing of the arms to a point wherein the arms snugly engage within the coupling socket and to prevent permanent deformation of the arms.

2. In a plug and socket coupling for electric cables, a plug which comprises a socket at one end adapted to be connected to the cable and two arms extending from the other end thereof, said arms adapted to fit in the coupling socket, said arms separated by a slot of width sufficient to permit permanent deformation of the arms and stop means locked in said slot adjacent the free ends of said arms to narrow its effective width and prevent permanent deformation of the arms to a dimension less than that effecting a snug engagement of the arms within the coupling socket.

3. In a plug and socket coupling for electric cable, a plug which comprises a solid body portion, a socket at one end of the body adapted to be connected to the cable and two plug arms extending from the opposite end of said body portion, said arms separated by a slot having width sufficient to permit deformation of the arms and stop means locked in said slot adjacent the free ends of said arms to narrow its effective width and prevent permanent deformation, said stop means comprising a lug extending inwardly into the slot from each arm of the plug adjacent to the face of the plug, said arms being snugly engaged within said coupling socket and said lugs being in substantial engagement to prevent effective reduction of the outer dimensions of said arms beyond that which will effect said snug engagement.

4. The process of making a plug for a coupler for electric cables, said process comprising machining a cam groove partially about the circumference of a cylindrical plug member, forming a boss track from the face of the cylinder to the bottom of the cam groove, bifurcating the cylinder by cutting it longitudinally on a diameter, spreading the arms to effect permanent distortion of them, restraining the spread arms in a separated position such that the outer diameter of the plug is substantially the same size as the socket into which the plug it to fit, and upsetting the metal adjacent to the face of the plug adjacent to the bifurcating slot to provide stop means projecting into the slot to prevent the arms from being flexed inwardly to a diameter less than the diameter of the socket with which the plug is to be used.

References Cited in the file of this patent

UNITED STATES PATENTS

| | | |
|---|---|---|
| 1,383,040 | Von Atten | June 28, 1921 |
| 1,977,846 | Febrey | Oct. 23, 1934 |
| 2,215,416 | Wolcott | Sept. 17, 1940 |
| 2,550,578 | McBerty | Apr. 24, 1951 |
| 2,572,956 | Servis | Oct. 30, 1951 |